FIG. I.

June 16, 1959  F. SCHLOSS  2,890,846
LOW FREQUENCY SHOCK NOISE MOUNTING
Filed March 4, 1955  2 Sheets-Sheet 2

INVENTOR
FRED SCHLOSS
BY
ATTORNEYS

United States Patent Office 2,890,846
Patented June 16, 1959

2,890,846

LOW FREQUENCY SHOCK NOISE MOUNTING

Fred Schloss, New York, N.Y., assignor to the United States of America as represented by the Secretary of the Navy Application March 4, 1955, Serial No. 492,321

9 Claims. (Cl. 248—22)

(Granted under Title 35, U.S. Code (1952), sec. 266)

The invention described herein may be manufactured and used by or for the Government of the United States of America for governmental purposes without the payment of any royalties thereon or therefor.

The present invention relates to a mounting for a structural unit and more particularly to a device for use as a noise and shock isolation mounting for machinery or the like. The mounting disclosed herein is similar to the novel mounting which forms the subject matter of applicant's application Serial No. 365,295, now Patent No. 2,830,780, dated April 15, 1958, but is intended for use in a range of substantially lighter loads.

The great advances made in the development of sonar equipment in recent years has made it possible to locate and detect a ship from the noise emanating therefrom, so that noise has become an increasingly important factor to the military both in its offensive and defensive tactics.

Inasmuch as all military vessels utilize machinery of one type or another, noise inherently generated by the machinery serves to the detriment of overall sonar efficiency of the vessels functioning as a team. Noise is also objectionable to the operating personnel of a vessel. Various methods may be employed to obtain noise reductions such as careful design and the use of shock absorbing mounting for machinery units. The latter method is the most efficient and economical means of accomplishing noise reduction especially since all machinery tends to wear through use and in time will become noisy. Many attempts have been made to provide mountings to reduce the transmission of noise through the mounting to the supporting structure, such as the hull of a vessel, but invariably the mountings have had poor noise attenuation characteristics or were structurally weak and failed under the shock conditions experienced in naval service.

As an indication of the problems arising, consider the fact that machinery noises generally are of low frequency. In a conventional mounting, provision to attenuate low frequencies and provision for shock protection without excessive motion of the unit under shock are related in an opposite sense i.e. the lower the natural frequency of the mount with a given shock severity the greater the physical motion and vice versa. As hereinafter used throughout the specification the natural frequency of the mount means the natural frequency of the system comprising the mount with its load. It is also known that when hard snubbing or sudden restraint of deflection is used in a mounting as a solution, a rapid change occurs in the slope of the load-deflection curve during shock conditions with the result that the equipment is subjected to greater accelerations than would be experienced if no mount had been used, thereby defeating the very purpose for which the mount is provided.

In accordance with the present invention a noise and shock isolation mount is provided for the support of a structural unit, the mount having a substantially constant natural frequency over a wide load range and using a single resilient element having non-linear load deflection characteristics. A low natural frequency mount is thereby provided which has excellent noise and shock attenuation characteristics and, in addition, sufficient structural strength to withstand dynamic or shock forces applied thereto. In the preferred embodiment, static forces applied to the mount are carried in shear and compression whereas shock forces per se are carried entirely as a compression force. Provision is also made to withstand and to absorb large shock forces applied to the under surface of the mount.

When a mount is in use a change in dimension over a period of time on a static load is frequently experienced. This phenomenon is known as "drift." Excessive drift is undesirable because of the change in alignment between the mount and the supported equipment, and because of the change of the final characteristic of the mount over the design characteristics. Experience has shown that in mounts using identical rubber compounds the unit supporting its load in shear drifts considerably more than a mount supporting its load substantially in compression. As will be hereinafter explained the disclosed mount carries its load mostly in compression.

Accordingly an object of this invention is the provision of a mounting having a low natural frequency for the support of a structural unit.

Another object of the invention is the provision of a low natural frequency mount which is effective to attenuate noise originating from the supported unit and applied to the mount.

A further object of the invention is the provision of a low natural frequency mount having structural strength sufficient to withstand large dynamic forces.

A still further object of the invention is the provision of a low natural frequency mount using a single resilient element having non-linear load deflection characteristics.

Other objects and many of the attendant advantages of this invention will be readily appreciated as the same becomes better understood by reference to the following detailed description when considered in connection with the accompanying drawings wherein.

Figure 1:
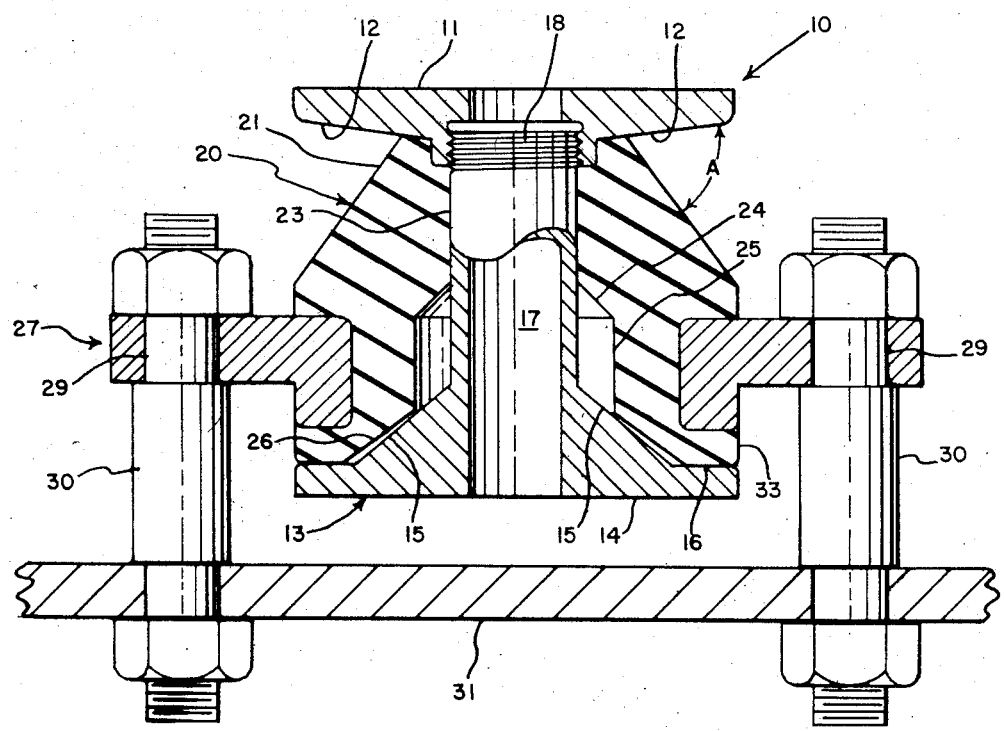
Fig. 1 is a vertical section showing a preferred embodiment of the invention drawn to scale.

Referring now to the drawings, wherein like reference characters designate like or corresponding parts through the several views, there is shown in Fig. 1, in a section taken substantially through the center of the structure, a low frequency isolation mount comprising a metal spool and a resilient body member. The metal spool consists of an upper flange member 10 and a lower portion comprising a lower flange member 13 and a sleeve 17. The resilient body member is designated by reference numerals 20.

The upper surface of the flange member 10 is indicated by reference character 11 and is substantially flat. Reference character 12 indicates the lower surface of the flange member 10; and this surface 12 is disposed at an acute angle to the plane of the upper surface 11, substantially as shown. The lower flange member 13 has a bottom surface 14 parallel to the horizontal plane and an upper surface comprising two parts, a frusto-conical portion 15 and a horizontal portion 16. The sleeve 17 arises from the apex of the aforementioned frusto-conical portion and is provided at the end thereof with threads 18 to cooperate with mating threads formed on the axis of symmetry of upper flange member 10 whereby the two parts are engaged to form a spool.

A resilient body member 20 made of a synthetic rubber, or the like, is supported between the two flange members and surrounds in embracing relation the sleeve 17 substantially as shown. The shape of the resilient member 20 is that of a body of revolution of its cross-section, shown in Fig. 1, about its vertical axis of symmetry. The upper portion 21 of the resilient member is formed in the shape of a frustrum of a cone with the apex abutting the lower surface 12 of the upper flange member 10. The lower portion of the resilient member is formed to the shape of a cylinder and extends from the base of the frusto-conical portion to the upper surface of the lower flange member 13. The resilient member 20 has a bore therethrough at the axis of symmetry thereof which bore, starting at the top, has a narrow passage 23 extending downward about one-inch in the scale drawing and fairing into an upper flared portion 24. A lower cylindrical passage 25 of greater width than the upper passage extends downward from the flared portion 24 and fairs into a lower flare portion 26 which forms a greater angle with the sleeve axis of symmetry than does the conical portion of the lower flange member 13, whereby the unloaded resilient member 20 does not engage the lower flange member 13 except at the outer extremities thereof, substantially as shown. The upper flaring portion 24 forms an angle of 45 degrees to the horizontal and it will be noted that an annular space is formed between the outer surface of the sleeve member 17 and the inner boundary surface of the passage 25. It will thus be seen since the body member 20 is made of synthetic rubber, a resilient material, and since both the conical upper surface and the cylindrical lower surface of the body are surfaces of revolution, the body member may be termed a resilient body of revolution, which term will be used hereinafter to define such member.

A mounting plate 27 is carried in an annular cut-out portion 33 of the resilient body member 20 at a portion of maximum diameter thereof. The inner part of the mounting plate is bent back upon itself to form a double L in cross-section, as shown in Fig. 1, and is bonded by any suitable means and method to the resilient body member. Holes 29 are formed adjacent the outer periphery of the mounting plate to receive bolts 30 which extend between the plate and a floor 31 to thereby support the mount and the structural unit carried thereon.

An important relationship exists between the lower surface 12 of the upper flange and the frusto-conical portion 21 of the resilient body. The angle A formed therebetween may range from 50 to 70 degrees but the angle of 62 degrees is the optimum divergence and is so shown in the scale drawing.

Figure 2:
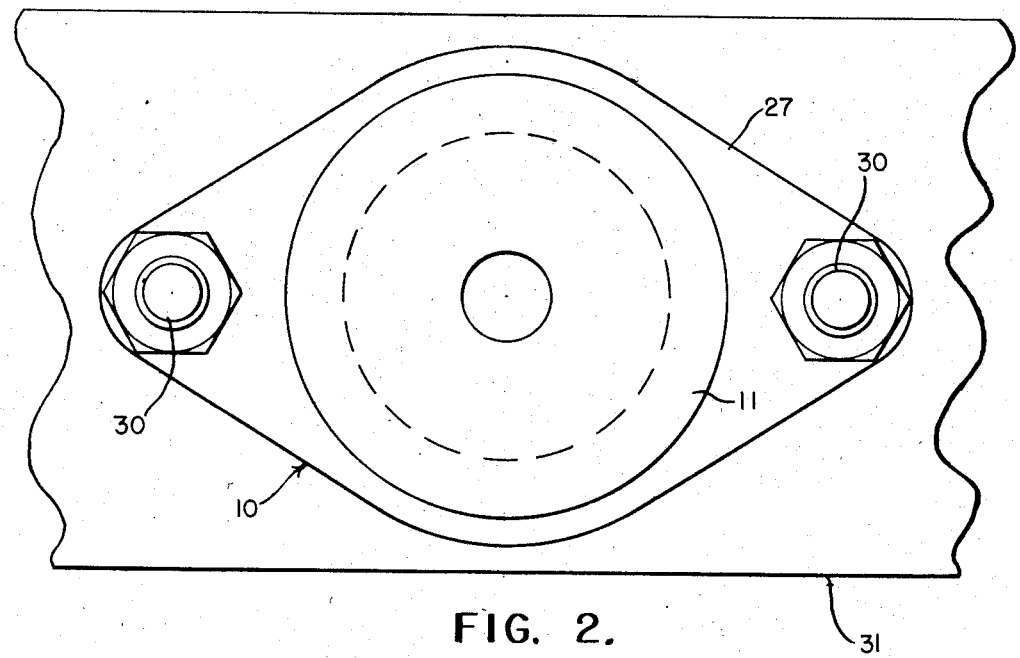
Fig. 2 is a plan view of the elements of the embodiment illustrating the top flange used to support the structural unit.

Fig. 2 illustrates the upper surface of the upper flange member 10 which is elliptical in form and has the maximum diameter of the center portion of approximately 4 inches in a preferred embodiment.

Figure 3:
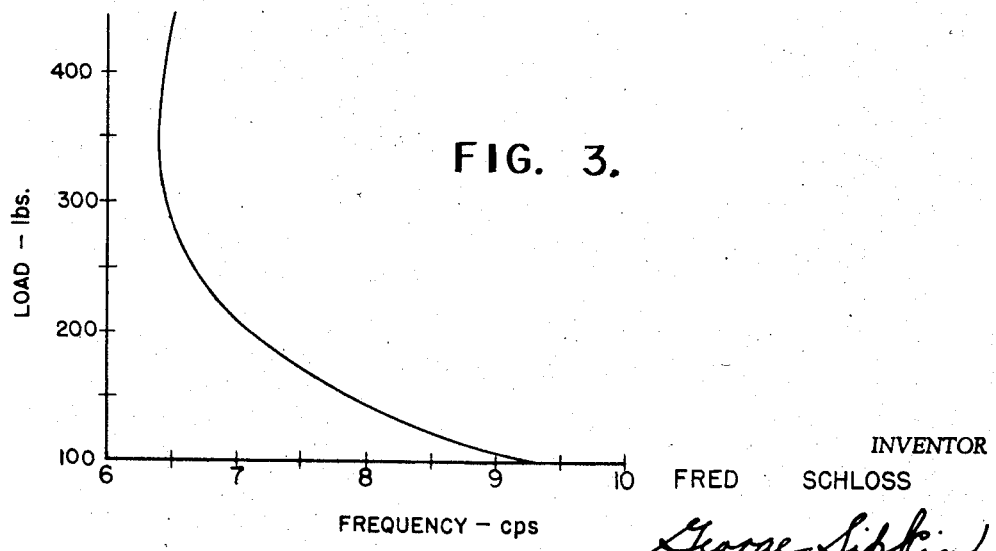
Fig. 3 is a curve showing the system frequency variation plotted against load.

The mount herein disclosed has a load range of from 100 to 450 pounds and a frequency range, as shown from Fig. 3, that varies from approximately 6½ cycles at 350 pounds to somewhat over 9 cycles at the lower rated range. The dynamic curve of Fig. 3 illustrates the average of four mountings as actually built and tested. The resilient member 20 which is preferably constructed of an elastomer compound is formed with such an overall contour as to support a static load under shear and compression but which changes with an increase in load such as by shock to support the load in compression.

If the above discussed angle A formed between the lower flange surface and the frusto-conical portion of the resilient member is too small, that is below 50 degrees, the rate of increase of stiffness changes abruptly with an increase in load and the frequency will thereby suddenly increase; if it be too large, above 70 degrees, the rate of contact area increase between the inclined portion of the flange and the snubber is too small and the frequency will decrease with an increase in the load. The angle must be uniform and approximately maintained over the upper surface of snubber until the diameter has reached or exceeded the diameter of the upper flange in order to obtain a maximum load range, in which the frequency is substantially constant. Lateral vibratory motions are resisted purely in shear by the portion of the resilient member extending between the mounting plate 27 and the sleeve 17. The separation of the internal surface 25 from the outer surface of the sleeve permits no portion of the body to be in compression and low lateral stiffness is thus obtained, thereby to provide excellent noise attenuation. When lateral shock exists the violent acceleration of the mounting plate 27 creates such deformation of the resilient body that the inner surface thereof engages the sleeve whereby the elastic space therebetween is compressed to attenuate the shock without excessive further excursions.

The mounting of Fig. 1 is shown in an uncompressed position since the actual shape of the rubber in a compressed shape is dependent upon the load and the compressed shape differs with various loads; however each mounting before being placed into operation is precompressed by rotating the several flanges relative one to the other, which rotation brings the flanges closer together and thereby compresses the elastic body carried therebetween. The elastic body is thus compressed an amount which is determined by the rating of the load of the mounting, the action of the mounting being such that under the minimum assigned load the sloped lower flare portion 26 of the resilient body member 20 will just break contact with the lower flange surface 15.

The precompression is desirable and necessary to reduce excursion under shock conditions. It is highly desirable that the lower portion of the resilient member 20 and the lower flange 13 do not touch under rated static load since the lower portion of the resilient member acts as a shock attenuator under upward motion. The smaller thickness of the elastic material at this portion of the body member 20 makes the attenuator stiffer than at the upper portion of the resilient body member 20; and it will be readily seen that if the attenuator did engage the upper surface of the flange member 13 under normal load then the natural frequency of the whole mounting system would be substantially raised. A physical separation under normal loads is carefully maintained and the conical shapes of the surface of the lower portion 26 and the upper surface 15 of the lower flange member control the rate of engagement between such surfaces so no large area is rapidly engaged. It should be incidentally mentioned that the varying thickness sections of both flange members is in accordance with proper structural design considerations. In each case the thickness in cross section of the flanges decreases with the increase in distance from the axis of symmetry thereof.

In operation the mount is precompressed as above described and suitably mounted such as by bolts 30 suitably secured to the mounting plate 27 on a foundation or floor 31, the static load being normally applied to the mounting on the upper flange 10. It will be understood that in particular installations it may be preferable to support the load on mounting plate 27 and to secure the system by means of the base, but in either event the operation and characteristics of the systems will be similar.

It will be seen from above that applicant has provided a greatly improved low drift single unit mounting for structural units having a low constant natural frequency whereby very efficient noise attenuation is obtained, and which is capable of withstanding and attenuating sudden and severe shock loads.

It should be understood of course that the aforegoing disclosure relates to only preferred embodiments of the invention and that numerous modifications or alterations may be made therein without departing from the script and scope of the invention as set forth in the appended claims.

What is claimed and desired to be protected by Letters Patent of the United States is:

1. An isolation mount adapted to support a structural unit comprising in combination a first flange adapted to support the unit, a second flange spaced from the said first flange, a cylinder interconnecting the said flanges at their respective axes of symmetry to form a spool, a resilient member in the form of a body of revolution of irregular external configuration supported between said first and second flanges and embracing said cylinder, the said flanges adjacent said cylinder being of thicker dimension than at the ends thereof, a mounting plate carried by said body of revolution, one end of said body of revolution being of substantially frusto-conical configuration and disposed adjacent said first flange and the other end of said body having a cavity formed therein to receive in part at least said second flange, the surface of the body member bounding said cavity being in part in intimate contact with said part of the second flange and in part spaced from such part of the second flange.

2. An isolation mount adapted to support a structural unit comprising in combination a first flange adapted to support the unit, a second flange spaced from the first flange, a cylindrical member interconnecting said flanges to form a spool, a resilient body member supported between said first and second flanges and having an axial bore formed therein, said axial bore being of irregular configuration with an upper portion thereof embracing said cylinder, an intermediate portion spaced from said cylinder and a lower portion flaring from said second portion, the outer portion of said resilient body member adjacent said first flange being of substantially frusto-conical configuration forming an angle of from 50 to 70 degrees with the inner surface of said first flange, the second flange having a portion thereof of frusto-conical configuration normally in spaced relation to the flared third bore portion of said resilient body member and a mounting plate carried by said resilient body member below the base portion of the said outer frusto-conical portion thereof.

3. An isolation mount adapted to support a structural unit comprising in combination when vertical, a spool comprising an upper flange, a lower flange and a post therebetween, a rubber snubber member supported between said flanges; said rubber member having a bore therethrough receiving said post, said bore having successive portions shaped as follows in a downward direction from the upper flange: a portion embracing said post, a first flaring portion, a cylindrical portion spaced from said post and a second flaring portion; said rubber member having an outer surface having successive portions shaped as follows in a direction downward from said upper flange: a flaring portion, and a lower portion having a recess therein adapted to receive a mounting plate.

4. An isolation mount as defined in claim 3 but further characterized by said recess lying substantially collateral with said cylindrical portion of said bore.

5. An isolation mount as defined in claim 3, but further characterized by said flaring portion of said outer surface making an angle of 50°–70° with the under surface of said upper flange.

6. An isolation mount as defined in claim 5 but further characterized by said lower flange having a flaring upper surface facing the said second flaring portion of said bore.

7. An isolation mount as defined in claim 6 but further characterized by said flaring upper surface of said lower flange being at an angle to the said second flaring portion of said bore.

8. An isolation mount as defined in claim 7 but further characterized by said recess lying substantially collateral with said cylindrical portion of said bore.

9. An isolation mount as defined in claim 8 but further characterized by said spool having a threaded connection between said post and one of said flanges.

References Cited in the file of this patent

UNITED STATES PATENTS

| | | |
|---|---|---|
| 2,588,171 | Smith | Mar. 4, 1952 |
| 2,600,090 | Barber et al. | June 10, 1952 |

FOREIGN PATENTS

| | | |
|---|---|---|
| 524,203 | Great Britain | Aug. 1, 1940 |
| 586,608 | Great Britain | Mar. 25, 1947 |